J. LAVERY.
DISK PLOW AND CULTIVATOR.
APPLICATION FILED AUG. 5, 1908.
960,966.
Patented June 7, 1910.
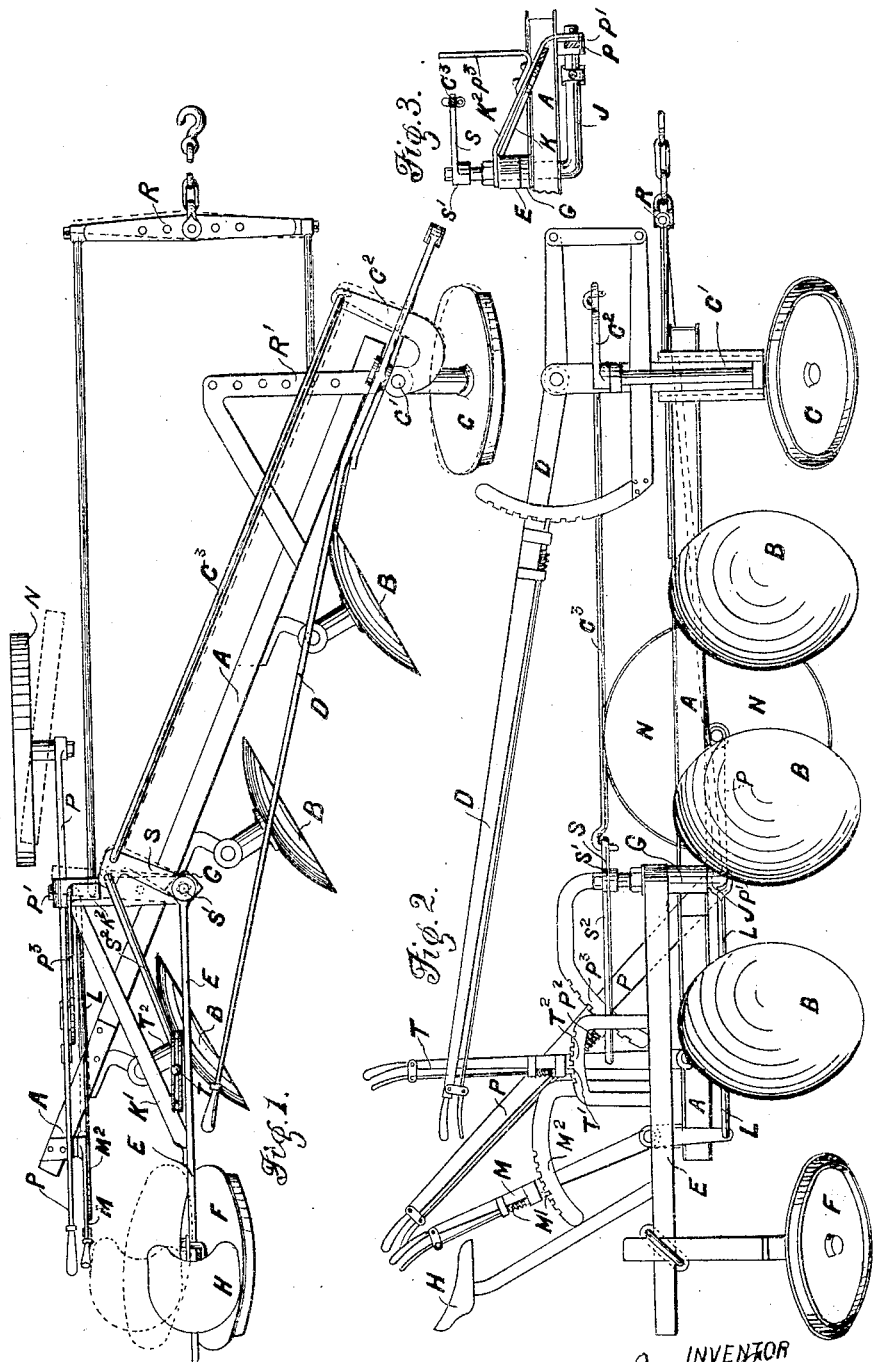
WITNESSES:
INVENTOR
John Lavery
BY
ATTORNEYS.

UNITED STATES PATENT OFFICE.

JOHN LAVERY, OF WAUBRA, VICTORIA, AUSTRALIA.

DISK PLOW AND CULTIVATOR.

960,966. Specification of Letters Patent. Patented June 7, 1910.

Application filed August 5, 1908. Serial No. 447,025.

*To all whom it may concern:*

Be it known that I, JOHN LAVERY, a subject of the King of Great Britain, residing at Waubra, in the State of Victoria, Commonwealth of Australia, farmer, have invented certain new and useful Improvements in Disk Plows and Cultivators, of which the following is a specification.

My invention relates to certain improvements in disk plows and cultivators and its object is to provide improved means whereby both the set of the disks and the width of the furrows may be adjusted at will according to the class of ground being operated upon.

I accomplish the object of my invention by mounting both the rear wheel and the driver's seat upon an arm hinged to the framework at the back and by providing this arm with means for adjusting its position laterally. In the preferred embodiment of the invention these means comprise an extension which projects from the arm at the hinge upon the left side of the plow and is provided at its outer end with a connecting rod attached to a hand lever having a spring catch and quadrant, so that it may be locked in position. Thus by moving and adjusting this hand lever the rearwardly extending arm carrying the rear wheel and seat is adjusted as a bell crank lever and the position of the rear land wheel with relation to the frame correspondingly altered. The land side wheel is mounted on the outer end of this extension of the hinged arm with a suitable spring catch lever for adjusting its height and correspondingly the lateral set of the plow. As a result of this arrangement I am enabled to swing the main frame-work of the plow, upon which the disks are carried, into different angular positions without swinging the rear wheel and the driver's seat out of their proper positions.

In order that my invention may be the better understood, I will now proceed to describe my invention by reference to the accompanying drawings in which, Figure 1., is plan, and Fig. 2., a side elevation of a disk plow to which my invention is applied. Fig. 3, is cross sectional view, partly in elevation taken just to the rear of the land wheel shaft and looking to rearward of the implement.

A, is the main framework of the implement which consists in this case of a main diagonal beam of angle steel, though it will be understood that my invention is equally applicable to other constructions of disk plows and cultivators. Upon this framework A, are mounted the disks B in any ordinary way. The plow shown consists of three of such disks B adapted for cutting three furrows.

Upon the front of the implement is mounted the forward guide wheel C secured to a vertical spindle C' and having a spring catch lever D by which the height of the framework may be adjusted as required. This spindle C' carrying the guide wheel C is provided with a crank arm C$^2$ connected by a rod C$^3$ to a control handle mounted as hereinafter described.

At the rear of the framework A is provided a rearwardly extending arm E carrying the rear wheel F. This rearwardly extending arm E is hinged to a framework A upon a bracket G preferably arranged between the two rear disks B and the arm E is adapted to pass over the top of and clear the said rearmost disk. The arm E also carries the driver's seat H. The arm E being hinged to the framework in the manner shown, it is capable of lateral adjustment, and thus the set of the disks and the width of the furrows cut may be regulated to suit the nature of the ground operated upon.

For the purpose of controlling the lateral adjustment of the rearwardly extending arm E the same is provided with a square socket into which fits the upwardly projecting member of a bent cross lever J, such member being accommodated in the bracket G, while the other member extends across the implement and underneath the main beam A. This lever or cross extension J is provided with stay pieces K' K$^2$ extending from its outer end one, K', to the rearward end of the arm E and the other K$^2$ to the upwardly extending member thereof at the point where it joins the arm E. This lever or cross extension J forms with the rearwardly extending arm E a bell-crank lever, the angle of which is hinged to the framework at the bracket G. The outer end of the cross arm or lever J is connected by means of a rod L to a hand lever M mounted upon the main beam A and having a spring catch M' and toothed quadrant M$^2$ by which the angle of the said rearwardly extending arm E to the main frame may be adjusted as required and correspondingly the rear wheel F, according to the nature of the ground traversed. Furthermore, the land side wheel or that upon the left hand side of the plow, is mounted upon the outer end of the cross extension J. For this purpose the land wheel N is mounted upon a lever P pivoted at P' to the cross arm J. The lever P is provided with a spring catch P² engaging a toothed rack P³. This toothed rack P³ is attached to the stay pieces K' K² before described. By operating the said lever P the height of the land side portion of the implement may be adjusted and correspondingly the lateral set of the implement. The front guide wheel C is also operated in conjunction with the rearwardly extending arm E carrying the rear wheel F by the connecting rod C³ being attached at its rear end to a swinging lever S pivoted at S' above the bracket G upon the frame A, and having another connecting rod S² leading to a still further hand lever T, mounted upon the rearwardly extending arm E, and having a spring catch T' and rack T² for relative adjustment. Thus in operation, as the rearwardly-extending arm E is moved from side to side, the wheels C and F are maintained in the same line of travel. The draft swingle bar R is connected on one side to the draft bar R' attached to the main beam A and on the other side to the hinged lever J, so that as the rearwardly extending arm turns upon its hinge in the bracket G the same is compensated in the draft.
In working, the rear wheel F travels in the land-side furrow cut by the last disk B. By operating the hand lever M this rear wheel F is thrown away from or in toward the main frame A, and the angle thereof altered. Simultaneously, the angles of the land wheel N mounted on the cross extension J and the front wheel C mounted on the front of the frame are correspondingly altered as shown in dotted lines, so that they maintain the same line of travel. In this way the set of the disks relative to the direction of travel is altered, and consequently the width of furrows cut, which may be adjusted to suit the ground being operated upon, a wider furrow being cut with softer ground and a narrower furrow in hard ground, so that the draft of the implement may be adapted to the number of horses employed, instead of, as heretofore, often having to remove one of the disks when comparatively heavy ground is encountered.

The implement is steered for turning purposes by means of the hand lever T which operates the front wheel C.

The height of the implement relative to the ground and consequently the depth of furrow cut is adjusted by operating either the hand-lever P which is connected to the land-side wheel N or by the hand lever D which operates the front wheel C or by working both as may be required.

I claim,

1. In disk plows and cultivators the combination of a framework, a rearwardly extending arm hinged to the framework and carrying the rear wheel and the driver's seat, a cross extension from the hinge-point of the said arm, a spring catch lever on the framework and connected to the outer end of the said cross extension and means for connecting the draft to the said cross extension substantially as described.

2. In disk plows and cultivators, the combination of a framework, a rearwardly extending arm hinged to the framework and carrying the rear wheel and the driver's seat, a cross extension from the hinge-point of the arm, a spring catch lever connected to the outer end of the said cross extension carrying the land-side wheel substantially as described.

3. A disk plow or cultivator comprising a framework, a rearwardly extending arm, hinged to the framework and carrying the rear wheel and the driver's seat, a cross extension from the said arm from the hinge-point, a spring catch lever mounted on the framework connected to the outer end of the said extension for adjusting its position and the lateral position of the said rearwardly extending arm, a spring catch lever mounted on the outer end of the said cross extension carrying the land wheel, a further spring catch lever mounted on the said rearwardly extending arm and connected to the front wheel for guiding the same and a connecting rod attached to the said cross extension at one end and to the draft at the other end, substantially as described and for the purposes indicated.

4. In disk plows and cultivators the combination of a frame-work, a rearwardly extending arm hinged to said frame-work, a rear-wheel shaft fixedly carried by said arm, a rear-wheel on said shaft, a driver's seat located over said wheel and carried by said arm, a cross-extension rigidly secured to said arm near the hinged joint thereof, a spring catch lever mounted on the free end of said cross extension, and a land side wheel carried by said lever.

In testimony whereof I have hereunto set my hand in presence of two subscribing witnesses.

JOHN LAVERY.

Witnesses:
CLEM. A. HACK,
E. L. ROSMAN.